March 7, 1961 W. E. ACHOR ET AL 2,974,213
GATHERING APPARATUS AND METHOD
Filed Oct. 15, 1956 3 Sheets-Sheet 1
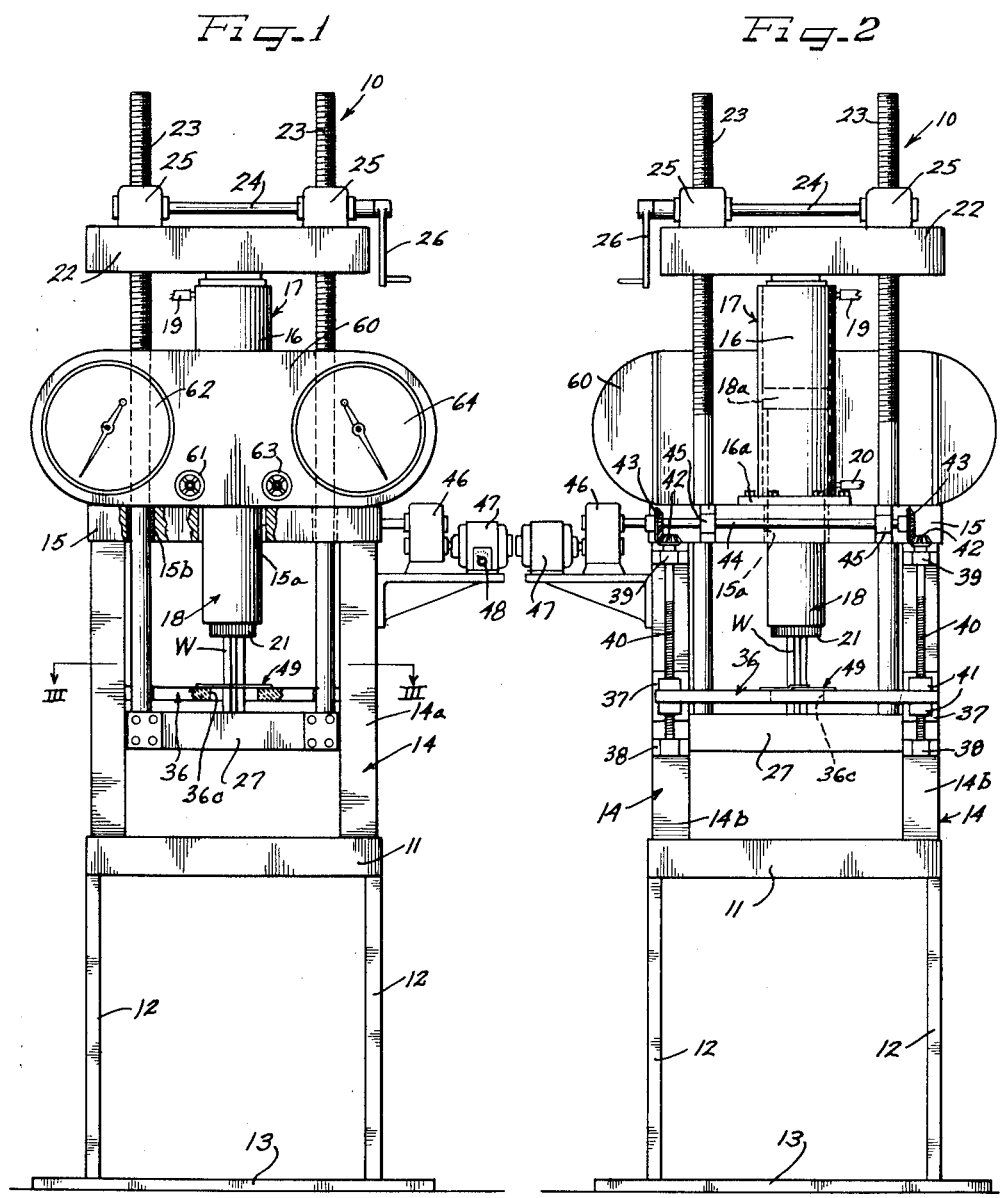
Inventors
WILLIAM E. ACHOR
EUGENE C. BOOTH
by Hill, Sherman, Meroni, Gross + Simpson
Attys.

March 7, 1961 W. E. ACHOR ET AL 2,974,213
GATHERING APPARATUS AND METHOD
Filed Oct. 15, 1956 3 Sheets-Sheet 2
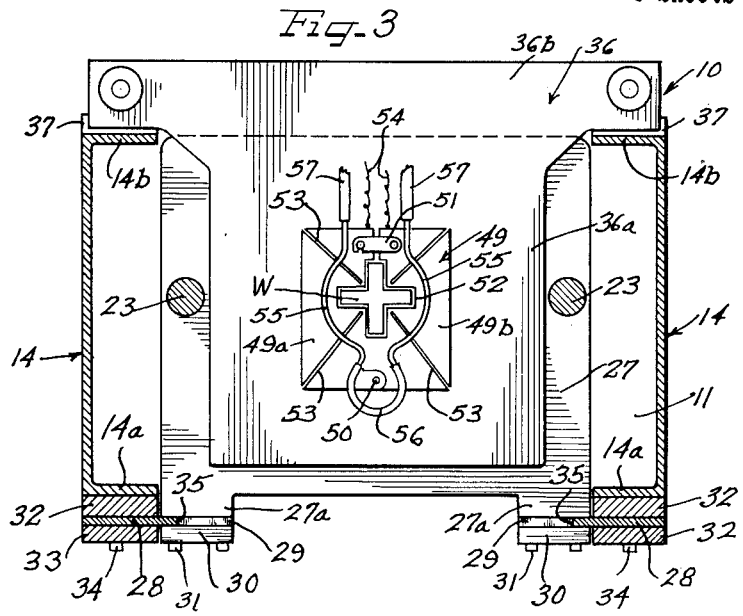
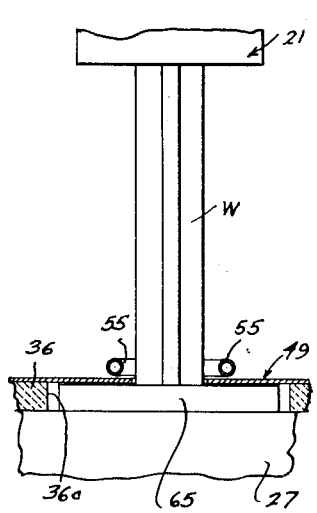
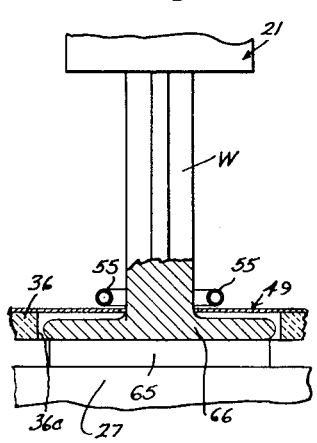
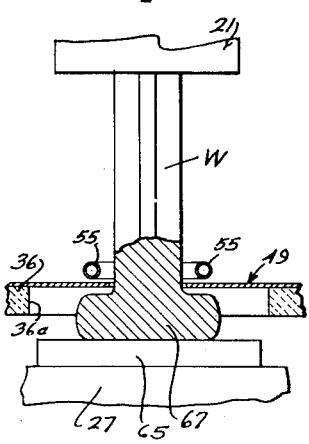
Inventors
WILLIAM E. ACHOR
EUGENE C. BOOTH

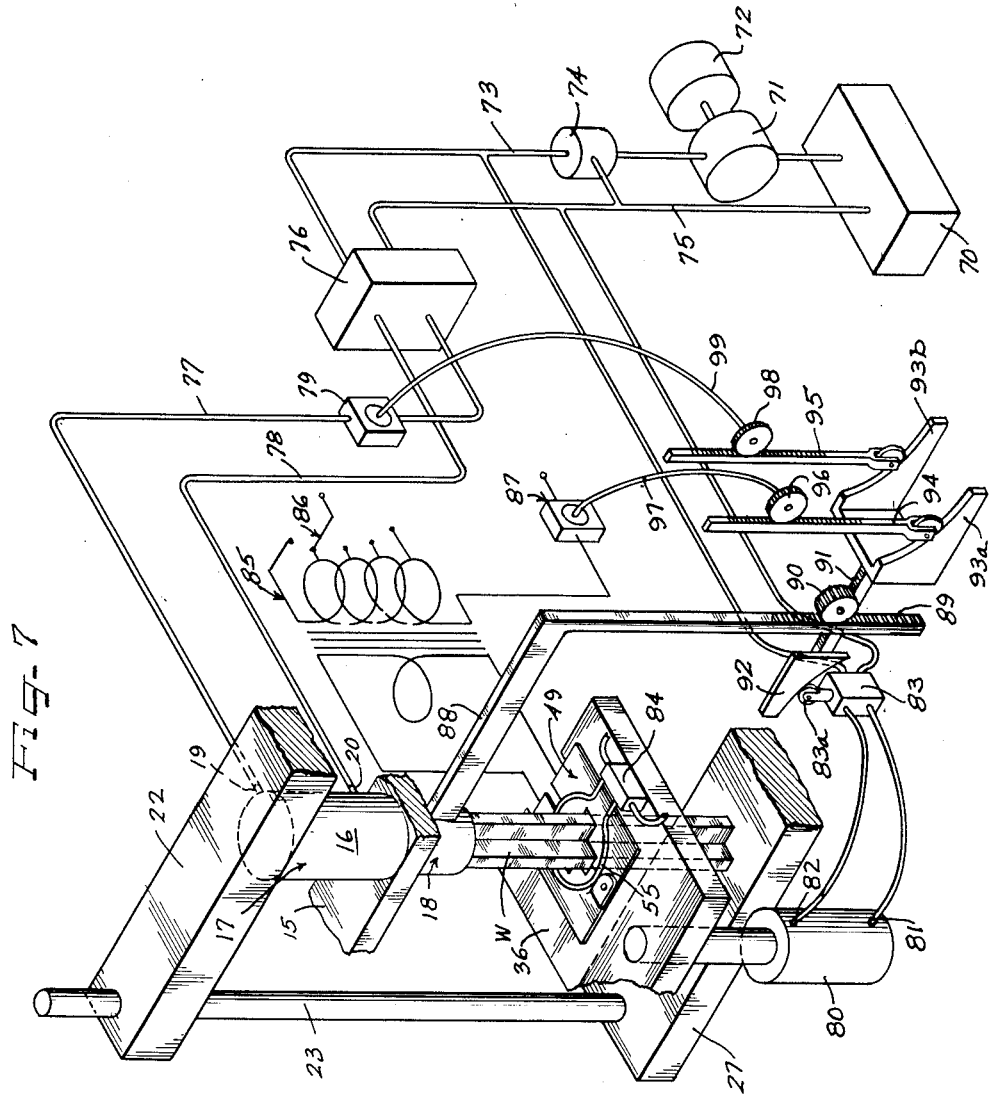

United States Patent Office 2,974,213
Patented Mar. 7, 1961

2,974,213

GATHERING APPARATUS AND METHOD

William E. Achor, Whittier, and Eugene C. Booth, Bell, Calif., assignors to Thompson Ramo Wooldridge Inc., a corporation of Ohio Filed Oct. 15, 1956, Ser. No. 616,085

22 Claims. (Cl. 219—7.5)

This invention relates to electric gathering or upsetting machines and methods of producing upsets on thermoplastic materials such as metals. Specifically, this invention relates to electric upsetting machines which apply continuous compression load to a thermoplastic article and successively heat very thin cross-sectional zones or areas of the article to plastic state to produce enlarged zones on the article of desired configuration and with wide parameters as to lateral dimensions. The specific invention also includes a method of upsetting thermoplastic articles of any shape to produce enlarged zones thereon which are not limited by heretofore encountered flow restrictions and are free from folds, voids or other defects.

In accordance with this invention, thermoplastic articles such as metal articles of any shape are subjected to compression load and are surrounded by a thin induction heating coil. The coil has an article-receiving aperture of the same configuration as the article so as to embrace the article in closely spaced symmetrical relation. The coil is preferably in the form of a thin copper plate which can be split and hinged to be easily removed from the article in the event that upsets are formed on both sides of the coil. Mechanism is provided to effect relative movement between the coil and workpiece independently of relative movement which is caused by the decreasing height of the workpiece due to the lateral upset or bulge being formed thereon in order that the thin cross-sectional zone of the article being heated will be maintained immediately in advance of the upset without permitting contact between the article and coil. This mechanism is conveniently in the form of a carriage which raises or lowers the coil relative to the article and preferably at a rate which is inversely proportional to the degree of lateral upset being formed on the article. Thus, a slow rate of rise is provided for a large lateral upset and a fast rate of rise is provided for a small lateral upset.

The exact rate is to be determined empirically by the exact shape desired for the upset.

In one embodiment of the invention, the rate and extent of coil movement relative to the article being upset is controlled by a variable speed drive for a carriage on which the coil is mounted. In another form of the invention, the proportioning of article movement to coil movement is automatically controlled by cams or templates, the control surfaces of which have been empirically developed in accordance with the desired shape of the upset. In all embodiments of the invention, however, the coil and article are shiftable relative to each other independently of or in addition to any relative shifting that might be caused by the foreshortening of the workpiece during the upsetting thereof so that a very thin cross-sectional area of the article is being heated just upstream from the bulge or upset on the article to flow properly heated plastic material into the desired upset zone without limitation. These thin plastic areas are not deformed until they are fed into the gather and they are then in the proper plastic state for good controlled upset flow. By controlled movement of the heater and the load on the workpiece any desired lateral and axial dimensions can be obtained in the gather or upset. Prior to this invention, it was not possible to upset induction heated metal articles more than about two and one-half times their wall thickness in any single operation before folds or other defects were encountered in the upset. While resistance heating techniques could be used to upset irregular shapes more than two and one-half times the wall thickness of the original workpiece the problems of maintaining constant electrical contact with the workpiece has made this technique commercially impractical. The present machines and methods completely remove this heretofore encountered limitation.

It is then an object of this invention to provide electric upsetting or gathering machines and methods which apply continuous compression loads to the articles to be upset and successively heat thin areas of the articles to feed plastic portions into the upset.

Another object of the invention is to provide machines and methods for upsetting or gathering thermoplastic materials wherein a heating device for placing the article in a plastic condition is shifted relative to the article at a controlled rate which may be unrelated to a rate created by the shortening of the article to successively heat new areas of the article for feeding plastic material to the upset.

A still further object of the invention is to provide machines and methods for effecting relative movement between an induction heater and a compression loaded thermoplastic article at a rate which is substantially inversely proportional to the amount of lateral upset to be formed on the article.

A further object of the invention is to provide an induction upsetting machine wherein the induction coil moves ahead of the upset material to remain out of contact with said material while maintaining a closely spaced relationship with the article.

A still further object of the invention is to provide an induction upsetting machine for metal articles of any desired shape which is adapted to uniformly produce upsets on the articles without restriction as to lateral dimension and without limitation as to relative shapes of the original article and upset portions thereof.

A still further object of the invention is to provide a method of upsetting wherein the upset zone will retain the configuration of the article from which it was produced.

A specific object is to provide an induction upsetting machine with an induction coil carriage that moves the coil relative to the workpiece being upset at a rate determined by the degree of upset.

Other and further objects of this invention will be apparent to those skilled in this art from the following detailed description of the annexed sheets of drawings which, by way of a preferred example only, illustrate two types of machines according to this invention adapted to carry out the methods of this invention.

On the drawings:

Figure 1 is a front elevational view of an induction upsetting machine of this invention.

Figure 2 is a rear elevational view of the machine of Figure 1.

Figure 3 is a transverse cross-sectional view on a larger scale, taken along the line III—III of Figure 1.

Figure 4 is a fragmentary, diagrammatic, elevational view with parts in vertical cross-section, showing an elongated metal article mounted in the machine of Figures 1 to 3 prior to upsetting the article.

Figure 5 is a view similar to Figure 4 but showing the relative positions of the parts in producing an upset end on the article having a greater lateral dimension than height.

Figure 6 is a view similar to Figure 5 but illustrating the relative positions of the parts wherein the lateral dimension of the upset end of the article is less than the height of the upset.

Figure 7 is a somewhat schematic isometric view of a gathering or upsetting machine according to this invention equipped with cam controls for regulating the relative rate of movement of the article and heater as well as for regulating the degree of heat.

As shown on the drawings:

The machine 10 of Figures 1 to 3 includes a rectangular or square base or bed 11 mounted on uprights 12 from a floor plate or anchor 13. The bed 11 has opposed channel upright beams 14, 14 rigidly mounted on the opposite sides thereof.

The channels 14, 14 have inwardly facing front end flanges 14a and rear end flanges 14b.

A heavy rigid top slab or plate 15 is secured on top of the channel sides 14, 14 in spaced opposed confronting relation above the bed plate 11 as shown in Figure 2. The rigid metal cylinder 16 of a hydraulic jack assembly 17 is mounted on top of the top plate 15 and has its open bottom end provided with a mounting flange 16a that is rigidly affixed to the top of the plate 15 around a central opening 15a in the plate. The jack assembly 17 includes an operating plunger or piston 18 with an enlarged head 18a at the inner end thereof slidably mounted in the cylinder and providing opposed faces to be acted on by fluid fed through or removed from a top port 19 and a bottom port 20 to raise and lower the plunger. As shown in Figure 2, the plunger fits freely through the aperture 15a of the top plate and has a pressure foot 21 on the bottom thereof.

A head 22 is mounted rigidly on top of the jack cylinder 16 and receives a pair of upright screw rods 23 therethrough. A cross-shaft 24 is rotatably mounted in housings 25 on top of the head 22 and has a crank 26 on one end thereof in order that the shaft can be readily rotated. The shaft drives lift nuts (not shown) in the housings 25 to raise and lower the screw rods 23.

The screw threads on the rods 23 terminate in spaced relation above the top plate 15 and the lower portions of the rod are smooth and slidably journalled through bushings 15b in the plate 15. The lower ends of the rods are anchored in an anvil 27. The anvil 27, as shown in Figure 3, fits between the side channels 14, 14 and is held by the rods 23 and by means of vertical tracks or ways 28 carried by the front end flanges 14a of the channels. Thus, as shown in Figure 3, the anvil 27 has portions 27a on the front face thereof projecting beyond the end flanges 14a to each of which is fastened a spacer plate 29 and an end plate 30 as by means of bolts 31. The front flanges 14a of the channels have plates 32 mounted thereagainst to support the tracks 28 and outer plates 33 on the outer faces of the tracks receive bolts 34 therethrough to clamp the tracks between the plates and to secure the tracks on the front face of the machine. Thus, the tracks 28 project into the grooves 35 provided by the spacer blocks 29 and end plates 30 on the projections 27a of the anvil 27.

In this manner, the anvil 27 is slidably mounted on the machine between the channel sides 14a, 14a thereof and is raised and lowered by the screw rods 23 under the control of the drive shaft 24. The level or height of the anvil 27 is therefore readily adjustable to determine the vertical height between the top plate 15 and the anvil.

A carriage plate 36 for the induction heating coil of the machine is positioned between the top 15 and the anvil 27. This plate, as shown in Figure 3, has a main portion 36a fitting freely between the screw rods 23 and terminating short of the front end of the anvil 27. An end portion 36b of the plate, however, is wider than the main body portion 36a and overlaps the rear end flanges 14b of the channels 14, 14. The channel flange overlapping portions of the rear end 36b carry vertical pads 37 which slide on the flanges 14b.

The rear flanges 14b have vertically spaced lower brackets 38 and upper brackets 39 rotatably supporting vertical screw rods 40 as shown in Figure 2. These screw rods are threaded through nuts 41 carried by the rear end portion 36b of the carriage plate 36 and serve to support the plate 36 so that its main body 36a will ride clear of any obstructions between the channel beams 14 in parallel relation with the anvil 27.

Gears 42 on the upper end of the screw rods 40 mesh with gears 43 on a cross-shaft 44 which is rotatably carried by journal brackets 45 on the rear end face of the top plate 15. The cross-shaft 44 is driven through a speed reducer 46 by a variable speed motor 47 having an accurate speed control 48. Thus, rotation of the shaft 44 by the motor 47 will raise or lower the carriage plate 36 in the space of the machine between the anvil 27 and the top plate 15.

The central portion of the main body 36a of the carriage plate 36 is provided with a relatively large aperture 36c and a single turn induction heating coil in the form of a thin copper plate 49 is mounted on top of the body portion 36a of the carriage plate 36 over the aperture 36c thereof. This plate 49 can be as thin as desired with thicknesses in the order of one-eighth inch (⅛") to one-half inch (½") being preferred. The carriage plate 36 can be composed of refractory material such as an asbestos slab which will heat-insulate and electrically-insulate the coil plate 49 from the anvil 27 and frame of the machine 10.

As best shown in Figure 3, the induction coil 49 is split and built up of two halves 49a and 49b hinged together at 50 and locked in closed position by a closure link 51 of insulation material. As illustrated, each plate half has the inner edge thereof so shaped as to provide a central aperture 52 through the closed plates which follows the configuration of the workpiece W. As illustrated, the workpiece W is an X-shaped metal bar with four equal legs radiating from the center thereof and closely surrounded by the plate 49 without being contacted by the plate.

In order to concentrate the flux of the induction heater at points where desired, as for example, in the corners between the legs, the plate halves 49a and 49b can have cuts 53 extending diagonally inward from the corners thereof into closely spaced relation with the aperture-defining wall 52. Current flows through the plate 49 as supplied from wires 54 respectively attached to each plate half 49a and 49b. As shown, the plate halves are spaced apart at the areas where the wires are attached so that current will flow completely around the aperture 52 to induce the proper flux for heating the workpiece W to a plastic state. As indicated, the flux can be concentrated where desired relative to the workpiece by the provision of the gaps 53 in the coil.

In order to prevent overheating of the coil plate as by radiation from the workpiece or the like, cooling coils 55 can be affixed to the plate halves 49a and 49b and joined to each other by a flexible section 56 which will permit the plate halves to be swung apart to open up the aperture 52 for removal of the workpiece as for example, when upsets are formed on both ends of the workpiece. The coils 55 can be supplied with coolant such as water or other refrigerant from flexible hoses 57 which will not interfere with movement of the carriage 36.

As shown in Figures 1 and 2, the workpiece W projects through the coil 49 and the carriage plate 36 out of contact therewith. The anvil 27 supports the bottom of the workpiece and the pressure foot 21 on the piston or plunger 18 of the hydraulic ram engages the top end of the workpiece. The anvil 27 is initially positioned to accommodate the workpieces of various heights and the carriage plate 36 is then positioned to place the coil 49 around the zone of the workpiece which is to be initially heated for forming the upset or enlargement thereon. Fluid under pressure is admitted to the jack cylinder through the top port 19 and exhausted from the cylinder through the bottom port 20 in order to force the piston head 18a downwardly and press the foot 21 on the workpiece. An instrument panel 60 is mounted upright on the front of the machine 10 and carries various controls including a valve handle 61 for regulating flow into the cylinder 16. Pressure in the cylinder is indicated by a gauge 62 on the panel. A rheostat handle 63 on the panel 60 regulates the current imput to the coil 49 and a meter 64 on the panel indicates the current imput. The speed control 48 on the motor 47 is also conveniently accessible from the front of the machine as shown in Figure 1.

When the desired preliminary load has been placed on the workpiece by the hydraulic ram assembly 17, the coil 49 then heats a very thin local zone or transverse area of the workpiece immediately adjacent the portion of the workpiece to be upset. If it is desired to form the upset on the very bottom end of the workpiece W then the initially heated zone is to be confined to the very bottom of the workpiece and the aperture 36c in the carriage plate 36 for the induction coil 49 is made large enough to freely accept the upset end to be formed and a spacer block 65 can be placed on the anvil to fit into this aperture 36c as shown in Figure 4 and thereby position the very bottom end of the workpiece W flush with the coil 49. The block 65 can be composed of refractory material which will not fuse with the plastic metal or other thermoplastic material supported thereon.

As shown in Figure 4, the pressure foot 21 on the piston 18 and the anvil 27 are separated sufficiently to receive the workpiece therebetween. The workpiece is then subjected to a compression load by the piston 18 and the coil 49 induces heat in the very bottom end portion of the workpiece to bring this portion to a plastic state. The plastic end then begins to upset or spread laterally and the carriage 36 is thereupon raised to keep the coil always in advance of the upset. The rate of rise is inversely proportional to the amount of lateral upset so that in producing a relatively large but thin upset 66 as shown in Figure 5 on the workpiece, the rate of rise of the coil 49 relative to the anvil 27 will be at a slow rate while the hydraulic ram will continue to feed more and more plastic metal into the upset permitting it to spread evenly in a lateral direction between the coil and anvil.

If, as shown in Figure 6, the upset end 67 is to have a greater height than the end 66, the coil 49 will be raised relative to the anvil 27 at a faster rate and the axial or longitudinal dimension of the upset will be built up without permitting the metal to spread laterally to the extent shown at 66.

The original configuration of the workpicee W is retained in the upset 66 and 67. Thus, the four equal legs of the original X-bar will be preserved in the upset but these legs, of course, will have the increased lateral dimension. If it is desired to alter the shape of the upset relative to the original contour of the article, and desired variation can be obtained by regulating the flux density at various points in the coil as by means of gaps 53.

The current imput to the machine will, of course, vary with the type of thermoplastic material being upset. For machines handling thermoplastic materials composed of iron or steel, the current imput will vary from 20 to 100 k.v.a. to produce gathering or upsetting temepratures in the range of 1800 to 2200° F. The pressure load on the workpiece will vary in accordance with the type of upset desired, the material being acted upon and the initial shape of the article. For mild steel articles such as bars or rods, ram pressures of from 5,000 to 15,000 pounds per square inch of cross-sectional area of the article are usable.

To provide for an automatic control of the relative rate of coil movement and workpiece movement, the machine 10 can be equipped with the controls illustrated somewhat schematically in Figure 7. As therein shown, hydraulic fluid for the ram assembly 17 is supplied from a tank 70 by a pump 71 driven by a motor 72. The pressure conduit 73 from the pump 71 has a relief valve 74 therein for relieving fluid back to the return conduit 75.

A four-way valve 76 controls flow of fluid from the pump 71 to the ports 19 and 20 of the cylinder 16 and is arranged so that fluid can be fed to either port under pump pressure and simultaneously returned from the opposite port back to the tank 70. Thus, a first conduit 77 connects one port of the valve 76 with the port 19 and a second conduit 78 connects another port of the valve 76 with the port 20. The conduit 77 has a pressure reducing valve 79 therein controlled by hereinafter described mechanism.

The motor driven screw rod mechanism for raising the coil 49 is replaced with a hydraulic jack 80 having a raising port 81 and a lowering port 82 fed with hydraulic fluid from the supply lines 73 and 75 under the control of a stationary valve 83 operating as a variable pressure reducing valve or a variable controlled flow valve. Alternately, the valve 83 can be mounted in the carriage 36 to ride against a control cam.

The anvil 27 can be positioned as in the machine 10 by the lift screws 23 (one shown in Figure 7) so as to vary the space between the piston and the anvil to receive work-pieces of various heights.

The cooling coil 55 of the induction heater can be automatically controlled by a thermostat valve 84 in the refrigerant feed line.

The induction heating coil 49 is energized from a transformer 85 which is initially manually set by a rheostat control 86. An automatic control 87 is also imposed on the transformer 85.

The piston 18 of the ram assembly 17 carries a rack bar 88 with teeth 89 driving a gear 90 which in turn drives a rack 91. The rack 91 has a cam 92 at one end thereof controlling the valve 83 and a pair of cams 93a and 93b at the other end thereof respectively driving racks 94 and 95. If the valve 83 is on the carriage, it will act as a tracer valve to ride on the cam 92 and keep the carriage in the cam determined position relative to the position of the ram piston 18. Thus, by merely mounting the valve 83 on the carriage 36, the position of the carriage 36 relative to the piston 18 can be controlled. The rack 94 in turn drives a gear 96 to control the heat control valve 87 as through a flexible shaft 97. The rack 95 drives a gear 98 which operates the reducing valve 79 as through a flexible shaft 99.

The machine with the automatic controls of Figure 7 is set up for operation in the same manner as the machine 10 of Figures 1 to 3 as described above. In the starting position the workpiece W is compression loaded between the anvil 27 and the piston 18 of a hydraulic ram assembly. The starting load is controlled by the initial setting of the pressure reducing valve 79 which admits fluid under controlled pressure to the top port 19 of the cylinder 16 thereby forcing the piston 18 downwardly. The hydraulic ram 80 is actuated to position the induction coil 49 at the desired level relative to the anvil 27 for location of the upset. The rheostat 86 is then set to energize the coil 49 and induce the desired heat in the thin zone of the workpiece surrounded by the coil. As the upset starts to form, the workpiece W, of course, is shortened and the piston 18 descends to move the rack bar 88 downwradly. This drives the gear 90 in a counter-clockwise direction to move the cam 92 to the right thereby permitting the feeler 83a of the valve 83 to rise and admit more fluid to the bottom port 32 of the hydraulic ram 80. This, of course, raises the coil 49 relative to the workpiece and anvil.

The same counter-clockwise movement of the gear 90 also moves the cam 93a to the right causing the gear 96 to actuate the valve 87 and increase the current imput to the coil. This, in turn, increases the heating rate of the workpiece. At the same time, the cam 93b raises the rack bar 95 to drive the gear 98 and open the reducing valve 79 to admit fluid under higher pressure into the top port 19 of the ram assembly 17. Thus, the upsetting operation is increased due to increased heat and load on the workpiece. It is desirable to start the upset at a lower rate to prevent high unit pressure on the anvil 27 which will tend to pit the anvil and form uneven lug-like or pilot-like ends on the upset. Once the upset has started to form, its contact area with the anvil 27 increases and unit pressure decreases. When a safe loading area on the anvil is obtained, the rate of upset can be increased without encountering pitting.

Thus, the controls of Figure 7 provide for the automatic relative movement of the coil 49 and the workpiece W to maintain the coil always in advance of the upset and prevents a short-circuiting between the workpiece and coil while at the smae time continuing to feed plastic zones of the workpiece to the upset.

Of course, the contours of the cams 92 and 93a and 93b can be varied to suit various desired operations. Thus, in some instances, it may be desirable to lower the upsetting pressures at certain stages of the operation to vary the shape of the upset. This can be done by design of the cam surfaces 93a and 93b to shift the reducing valve 79 to vary the load on the workpiece as well as to shift the heat control valve to vary the temperature induced by the induction coil 49 into the workpiece.

It should also be understood that the electric motor drive of the machine of Figures 1 to 3 could be used in place of the hydraulic drive 80 for the coil 49 since the cam 92 could control the speed regulating device 48 for the motor 47 instead of controlling the valve 83.

From the above descriptions it will, therefore, be understood that this invention provides machines and methods for gathering or upsetting thermoplastic materials such as metal wherein an electric heating element is moved relative to the article being upset so as to progressively feed thin zones of the material in a plastic state into the upset thereby avoiding heretofore encountered limitations in the degree of lateral upset and also avoiding heretofore encountered folds and defects in the upset portion. The degree of lateral upset on articles made according to the method or on the machines of this invention is not limited to the columnar theory of upset.

It will be understood that variations and modifications may be effected without departing from the scope of the novel concepts of this invention.

We claim as our invention:

1. A method of upsetting thermoplastic material which comprises longitudinally compression loading a thermoplastic article, heating a thin transverse zone of the loaded article to a plastic state, shifting the areas being heated to progressively plasticize thin areas immediately adjacent the portion of the article to be upset and feeding the plasticized areas into the upset.

2. The method of upsetting thermoplastic material which comprises longitudinally compression loading the material, induction heating a thin transverse area of the material to a plastic state, forming an upset on the material from said area, successively induction heating thin adjacent areas of the material to plastic states, and supplying said additional plastic areas into the upset.

3. The method of forming a laterally enlarged upset portion on a thermoplastic article which comprises surrounding said article with an induction coil, induction heating a thin section through said article to a plastic state, longitudinally compression loading the article to upset the plastic section thereof and effecting relative movement between the coil and loaded article to successively heat thin sections of the article adjacent the upset for supplying plastic material to the upset.

4. The method of forming a laterally enlarged portion on a thermoplastic article which comprises surrounding a thin transverse area of said article with an induction coil, induction heating a thin section through said article to a plastic state, longitudinally compression loading the article to upset the plastic section thereof, and effecting relative movement between the coil and compression loaded article at a rate in inverse proportion to the amount of lateral upset to be formed on the article.

5. The method of upsetting a portion of a metal article to form an enlarged zone of controlled shape and size which comprises surrounding the article with a thin induction coil having an aperture of the same configuration as the article therein and only slightly larger than the cross-sectional area of the article, aligning the article in the coil aperture to have all the surfaces of the article in the aperture equally spaced from the coil in close confronting relation to the coil, induction heating a thin cross-sectional area of the article surrounded by the coil to a plastic state, compression loading the article sufficiently to upset the plastic area thereon, relatively shifting the coil and article to advance the article through the aperture, and controlling the rate of shift relative to the compression load to maintain the coil ahead of the upset area and to feed successive plastic areas of the article into the upset zone.

6. The method of upsetting metal articles and the like thermoplastic materials which comprises compression loading a metal article between an anvil and a ram, induction heating a thin zone of the article between the ram and anvil to place said zone in a plastic state, laterally upsetting the plastic state under the influence of the compression load on the article, and relatively shifting the anvil and induction heater independently of the degree of collapse of the article to control the size and shape of the upset and progressively feed thin plastic areas of the article into the upset.

7. The method of upsetting thermoplastic material which comprises compression loading the material, induction heating a thin transverse area of the loaded material to a plastic state and effecting relative movement between the compression loaded article and the induction heater in the direction of compression load independently of the degree of foreshortening of the article being upset to progressively feed thin transverse plastic zones into the upset.

8. The method of upsetting metals which comprises compression loading a metal article between an anvil and a hydraulic ram, induction heating a thin zone of the article between the anvil and ram, laterally upsetting the induction heated zone of the article to increase the lateral dimension and decrease the longitudinal dimension of the article, increasing the load on the article as the lateral dimension of the upset increases, and effecting relative shifting of the anvil and induction heater as the article diminishes in longitudinal dimension and controlling the relative shifting of the heater and anvil at a rate different from the rate of reduction of the longitudinal dimension of the article to thereby provide an upset of desired lateral and longitudinal dimensions.

9. An upsetting machine which comprises an anvil, a fluid pressure actuated ram opposing the anvil, an electric heater between the ram and anvil, and means for relatively shifting the heater and anvil in the direction of the compression load applied by the ram and anvil as the distance between the ram and the anvil decreases whereby the heater will supply heated plastic areas of the article to the upset formed on the article at a rate to control the axial and lateral dimensions of the upset.

10. An upsetting machine which comprises an anvil, a compression loading device in spaced opposed relation to the anvil for compression loading an article between the anvil and the device, an electric heater between the loading device and the anvil adapted to locally heat a thin zone of an article compressed between the device and anvil, and means for effecting relative movement of the heater and anvil in a direction substantially parallel to the direction of the compression load to control the size and shape of the upset to be formed on the article.

11. An upsetting machine which comprises an anvil, a fluid pressure loading device opposing the anvil, an induction heating coil between the anvil and device adapted to surround an article extending from the anvil to the device, and means for relatively shifting the coil and anvil in a direction substantially parallel to the compression load as the loading device moves toward the anvil for creating the shape and size of an upset being formed on the compression loaded article.

12. An induction upsetting machine which comprises a frame, a fluid pressure cylinder fixedly carried by said frame, a fluid actuated piston slidably mounted in said cylinder, an anvil in spaced opposed relation with the piston, adjustable support devices on the machine for spacing the anvil relative to the cylinder, an induction heating coil between the piston and anvil adapted to surround an article loaded by the piston on said anvil, and mechanism on said machine for relatively shifting the induction coil and anvil to progressively position the coil around successive areas of an article between the piston and anvil to feed plastic zones of the article into an upset being formed on the article.

13. An upsetting machine which comprises a frame having spaced opposed sides and a top joining said sides, a ram cylinder fixedly mounted on said top, a piston in said cylinder extendable through an aperture in said top, a head mounted on said cylinder, screw rods carried by said head, mechanism on said head for raising and lowering said screw rods, an anvil carried by said screw rods between said side frames beneath said top in opposed relation to said piston, said anvil being raised and lowered with said screw rods, a carriage supported by said side frames between the anvil and the top, an electric heater on said carriage, and means for raising and lowering said carriage relative to said anvil.

14. An electric gathering machine comprising an anvil, a loading device in spaced opposed relation to the anvil, means for shifting the anvil to vary the space between the loading device and anvil for accommodating workpieces of different size therebetween, an electric heater between the anvil and loading device adapted to surround a workpiece and heat a local zone of the workpiece to a plastic state, means for energizing the loading device to compression load a workpiece on the anvil and gather an upset portion from the plastic local zone heated by said heater, means for shifting said heater relative to said anvil, and control mechanism for said means for shifting the heater to keep the heater ahead of the gather being formed on the workpiece for feeding additional plastic zones into the gather.

15. An electric gathering machine comprising an anvil, a loading device in spaced opposed relation to the anvil, an electric heater between the anvil and loading device adapted to surround a workpiece and heat a local zone of the workpiece to a plastic state, means for energizing the loading device to compression load a workpiece on the anvil, a mechanical drive means for shifting said heater relative to the said anvil, and a speed control for said mechanical drive means to regulate the rate of shift to keep the heater in spaced relation from the gather being formed on the workpiece whereby additional plastic zones of the workpiece can be fed into the gather and the lateral extent of the gather can be accurately controlled.

16. An electric gathering machine which comprises an anvil, a loading device in spaced opposed relation to the anvil adapted to compression load a workpiece between the device and anvil, an electric heater between the loading device and anvil adapted to surround a workpiece under compression load between the loading device and anvil, means for energizing said loading device, control means for said energizing device actuated by the movement of the device toward the anvil, means for shifting said heater relative to the loading device and anvil, a control mechanism for said means for shifting the heater, regulating means for said control mechanism actuated by movement of the loading device, means for varying the heat imput to said heater, and a control mechanism energized by movement of the loading device for regulating said heat input means.

17. An electric gathering machine which comprises an anvil, a loading device in spaced opposed relation to the anvil, an induction heating coil between the anvil and loading device adapted to surround a workpiece extending between the loading device and anvil, a first cam means shifted by the loading device for regulating the position of the heating coil, a second cam means actuated by the loading device for regulating the heat imput to the heating coil, a third cam means actuated by the loading device for controlling the means for energizing the loading device, said cam means coacting to correlate compression load on the workpiece, heat imput to the workpiece, and the zones of the workpiece under the influence of the heat imput for determining the shape of the gather formed on the workpiece.

18. An induction upsetting machine which comprises an anvil, a hydraulic ram in opposed relation to the anvil adapted to compression load a workpiece on the anvil, an induction heating coil between the ram and anvil adapted to surround the loaded workpiece therebetween, hydraulic means for shifting the heating coil toward and away from the anvil, a first cam controlling said hydraulic means for shifting the coil, a second cam for controlling the heat imput to the coil, a third cam for controlling the energization of the hydraulic ram, and means actuated by the hydraulic ram for shifting said cams to increase the heat imput as the upset on the workpiece increases, to shift the heating coil ahead of the upset, and to increase the load on the workpiece as the upset increases.

19. The method of forming an upset on a workpiece which comprises compression loading the workpiece, heating a local zone of the compression loaded workpiece to a plastic state, initiating the formation of an upset on the workpiece at the plastic zone thereof, increasing the compression load on the workpiece as the extent of the upset increases, shifting the heating of the workpiece in advance of the upset, and increasing the rate of heat input to the workpiece as the lateral extent of the upset increases.

20. A method of modifying the cross-sectional configuration of an article in a plane perpendicular to an axis of the article, said method being characterized by the use of a heating means and including the steps of: heating the article with said heating means in a heating zone on the axis of the article to soften the article in said heating zone; moving a portion of the article axially of the article toward said heating zone to upset the article in said heating zone; and progressively relatively moving the entire article and said heating means axially of the article so as to progressively relatively move the entire article and the heating zone axially of the article.

21. A method of upsetting an elongated article, characterized by the use of a heating means and including the steps of: heating the article with said heating means in a heating zone spaced from one end of the article to soften the article in said heating zone; moving said one end of the article axially of the article toward said heating zone to upset the article in said heating zone; and progressively relatively moving the entire article and said heating means axially of the article in such a direction as to decrease the spacing between said heating means and said one end of the article, whereby to progressively relatively move the entire article and the heating zone axially of the article in a direction such as to decrease the spacing of the heating zone and said one end of the article.

22. In an apparatus for upsetting an elongated article, the combination of: heating means for heating the article in a heating zone spaced from one end of the article to soften the article in said heating zone; means engageable with the article for moving said one end thereof axially of the article toward said heating zone to upset the article in said heating zone; and means for progressively relatively moving the article and said heating means axially of the article in such a direction as to decrease the spacing between said heating means and said one end of the article, whereby to progressively relatively move the entire article and said heating zone axially of the article in a direction to decrease the spacing between said heating zone and said one end of the article.

References Cited in the file of this patent

UNITED STATES PATENTS

| | | |
|---|---|---|
| 2,275,763 | Howard et al. | Mar. 10, 1942 |
| 2,463,669 | Wright | Mar. 8, 1949 |
| 2,464,658 | Stivin | Mar. 15, 1949 |
| 2,665,359 | Knight | Jan. 5, 1954 |
| 2,767,290 | Chapman et al. | Oct. 16, 1956 |